United States Patent [19]

Ruetman

[11] 3,853,885

[45] Dec. 10, 1974

[54] HEPTACHLORO-5H-1-PYRIDINE AND A METHOD FOR THE PREPARATION THEREOF

[75] Inventor: Sven H. Ruetman, Walnut Creek, Calif.

[73] Assignee: The Dow Chemical Company, Midland, Mich.

[22] Filed: May 3, 1973

[21] Appl. No.: 357,043

[52] U.S. Cl. .......... 260/290 R, 260/290 HL, 71/94, 424/263
[51] Int. Cl............................................. C07d 39/00
[58] Field of Search...................................... 260/290

[56] References Cited
UNITED STATES PATENTS
3,420,833   1/1969   Taplin................................. 260/283

Primary Examiner—Harry I. Moatz
Attorney, Agent, or Firm—J. Roger Lochhead

[57] ABSTRACT 2-(n-propyl)pyridine, 4-(n-propyl)pyridine or mixtures thereof are converted to novel heptachloropyrindines by vapor phase chlorination in the presence of an inert diluent at temperatures of about 500° to 600°C. The products are versatile intermediates for the preparation of biologically active compounds. They are also fungicides and microbicides.

4 Claims, No Drawings

HEPTACHLORO-5H-1-PYRIDINE AND A METHOD FOR THE PREPARATION THEREOF

BACKGROUND OF THE INVENTION

U.S. Pat. No. 3,420,833 (Taplin) teaches generally that aromatic-N-heterocycles substituted with alkyl groups of from one to three carbon atoms can be substituted with three or more chlorines by vapor phase chlorination. More specifically, the introduction of from 3 to 6 chlorines in methyl-substituted pyridines at temperatures of from 400° to 480°C. and conversion of 2-ethylpyridine to a mixture of tri- and tetra chloro 2-ethyl pyridines at 420°C. is taught. Temperatures of 500° and up are said to result in chlorinolysis of alkyl substituents with consequent formation of perchlorinated nucleus compounds, such as pentachloropyridine.

Similarly, U.S. Pat. No. 3,583,988 (Johnston and Ruetman) discloses that chloronolysis of methyl groups in methyl-substituted, saturated-N-heterocycles results when said compounds are aromatized and chlorinated at temperatures of 450°C. and up.

U.S. Pat. No. 3,592,817 (Johnston, Ruetman and Marinak) teaches conversion of adiponitrile to perchlorinated cyano pyridines by chlorination at temperatures of about 600°C. The requisite cyclization involves formation of a bond between the nitrogen of one —CN group and a carbon alpha to the other —CN group.

Holtschmidt (Angew. Chem. internat. edit., 1 632 (1962) described a different type of cyclization in which perchloroquinoline is formed by liquid phase chlorination, at about 200°C., of the compound 0-N(COCl)CH$_2$—CH$_2$—CH$_3$.

British Patent No. 1,177,628 claims heptachloroindole as a novel N-chloro compound of remarkable stability and having utility as an intermediate for the synthesis of indigo and azo dyes. The latter compound, while being isomeric with heptachloropyrindines, contains an N-Cl group.

SUMMARY OF THE INVENTION

A prevaporized solution of 2- or 4-(n-propyl) pyridine or a mixture thereof, in a substantially inert diluent, is rapidly and turbulently mixed with at least 10 molar proportions of chlorine in a reaction zone maintained at a temperature within the range of about 500°C. to about 600°C. The reaction mixture is maintained in said zone for at least 1 second and then removed and worked-up by conventional techniques. The reactor surfaces are made of chlorineresistant materials such as nickel, carbon, silica, glass and the like.

When 2-n-propylpyridine is treated in the preceding manner, there is produced a new compound, heptachloro-5H-1 pyrindine. When the pyridine starting material is 4-n-propylpyridine, there is produced a new compound which is one of the isomers, heptachloro5H (or 6H or 7H)-2-pyrindine.

The pyrindine compounds of the invention are versatile intermediates. The chlorines ortho and para to the nitrogen of the pyridine are replaceable by a variety of nucleophiles. The geminal chlorines in the 5-position are particularly reactive and enter into a variety of reactions typical of dichloromethyl groups in which the chlorines have some allylic character. The resulting products have utility as pesticides and as flame retardant additives in polymers. The perchloropyrindines are also useful as fungicides and microbicides.

DETAILED DESCRIPTION OF THE INVENTION

Suitable starting materials are 2-n-propyl pyridine, 4-n-propylpyridine or mixtures thereof.

Suitable, substantially inert diluents are excess chlorine or inert gases, such as nitrogen, $CO_2$ or the noble gases and liquids or low melting solids which are not detrimentally reactive with chlorine or the n-propylpyridines. Exemplary of the latter type of diluents are: chlorinated hydrocarbons, such as $CCl_4$, $CHCl_3$, ethylene dichloride and hexachlorobutadiene; perfluorinated hydrocarbons and perfluorochlorohydrocarbons; and halogen-substituted aromatics, such as pentachloro pyridine and isomeric di- or trichlorobenzenes. The preferred diluents are volatile perchlorinated hydrocarbons such as tetrachloroethylene and carbon tetrachloride.

In carrying out the process of the present invention, mixed vapors of 2- or -4-N-propylpyridine and an appropriate diluent are rapidly and turbulently mixed with an excess over the stoichiometric amount of gaseous chlorine during a brief contact time at temperatures of from about 500° to about 600°C., preferably about 540° to about 560°C.

The n-propyl pyridine ordinarily is dissolved in a volatile diluent in an amount to provide a concentration therein of from 0.5 percent by weight to saturation. Preferably, the concentration is within the range of 5–10 percent by weight. The solution is then vaporized by heating, as in a wiped film evaporator for instance, and the mixed n-propyl pyridine and diluent vapors are introduced to the reactor. The requisite rapid and turbulent mixing with chlorine is accomplished, for example, by mixing these vapors with gaseous chlorine in a nozzle just prior to injection into the reactor. Alternatively, a vaporized n-propyl-pyridine feed stream and gaseous chlorine are separately but simultaneously jetted into the reactor in such a manner as to ensure very rapid and turbulent mixing. The rate of flow of the mixed diluent and reactants at the point of mixing should be such as to ensure a Reynolds number of at least 800 and preferably of about 2000. Generally, a mixed vapor velocity of about 1000 to 3500 cm per second is considered desirable. The residence time of the mixed reactants in the reaction zone should be from about 1 to about 50 seconds and is preferably from about 10 to about 25 seconds.

Operating pressures are not critical and may vary from sub-atmospheric to superatmospheric. Atmospheric pressure is preferred.

The molar ratio of chlorine to the n-propyl-pyridine can range from about 10/1 to about 100/1 or higher. Preferably, the ratio is from about 20/1 to about 50/1. An excess of chlorine can also be employed in place of the diluent, although this is a less preferred mode of operation.

In general, it is preferred to carry out the process as an adiabatic reaction in an insulated reactor. However, non-adiabatic operation is feasible by resort to conventional heat exchange methods and by adjusting the proportion of diluent employed to control the heat capacity of the reaction mixture.

Any suitable reactor may be employed and, since the reaction is exothermic, strong heating is required only at the initiation of the reaction. Thereafter heat input is only necessary to compensate for heat loss to the environment. The inlets, outlets and interior surfaces of the reactor must be of materials which resist corrosive attack by chlorine and hydrogen chloride at high temperatures. Thus, for example, such surfaces may be nickel, carbon, silica or glass. In practice, it has been found that thermally resistant, high-silica glass, such as Vycor brand, is satisfactory.

Upon exiting from the reactor, the effluent gases are worked-up by conventional techniques. For example, the reaction is quenched and the gaseous reaction mixture condensed by cooling. Thereafter, the condensate is stripped of chlorine, HCl and diluent and the residual crude product is utilized as such or purified by recrystallization, distillation or sublimation.

In the following examples, two laboratory reactors, differing only in size, were employed. The first reactor consisted of a cylinder of Vycor high-silica glass (8.3 cm. in diameter and 41.5 cm. in length) which was tapered at the top and bottom respectively to inlet and outlet tubes and fitted with electrical heating coils and insulation to serve as a reactor having a capacity of about 2.25 liters. The outlet end of said reactor was connected to a cooled collection vessel which was vented through a reflux condenser to an acid-gas recovery system.

The inlet tube ended in a nozzle projecting about 2.5 cm. into the reactor and having an opening into the reactor about 2.5 mm. in diameter. Inside the nozzle was a smaller concentric tube for chlorine introduction, said tube ending about 2.5 cm. upstream from the nozzle opening. The upstream end of the inlet tube was connected to an electrically heated vaporizer/preheater tube used for vaporizing the reactant and the diluent.

The second reactor comprised a smaller Vycor cylinder having the same length to diameter proportions but an effective capacity of only 1350 cc. In both examples, a pressurized feed of a $CCl_4$ solution of the n-propyl pyridine was forced through a rotameter at a preselected rate into the tubular preheater, the exit temperature of which was kept from 15° to 31°C. above the boiling point of the pyridine compound. The hot feed vapors were then mixed in the inlet nozzle with a stream of gaseous chlorine fed at a preselected rate through a rotameter to the inner tube of the nozzle. The hot exit gases were condensed in a series of two dry ice/methylene chloride traps containing $CCl_4$. The crude chlorinated products were isolated by evaporating off the volatiles, and analyzed by gas-liquid chromatography. The desired components were then isolated from the crude product by recrystallization.

EXAMPLE 1

Chlorination of 2-n-Propylpyridine

| | | |
|---|---|---|
| Reactor Volume | | 1350 cc. |
| Feed | 10% | by weight in $CCl_4$ |
| Feed Rate | | 4.0 g/min. |
| Chlorine Rate | | 5.1 g/min. |
| Molar Ratio of $Cl_2$/pyridine deriv. | ~ | 22/1 |
| Reactor Temperature | | 550°C. |
| Vaporizer Exit Temperature | | 180°C. |
| Residence Time | | 12 sec. |
| Nozzle Velocity | ~ | 2260 cm./sec. |
| Run Time | | 140 min. |
| Crude Yield | | 115 grams |

Gas-Liquid Chromatography (g.l.c.) Analysis:

32% of pentachloropyridine,
26% of heptachloro-2-vinylpyridine
38% of heptachloro-5H-1-pyridine, and
4% of unidentified small peaks.

The crude product was recrystallized from acetone/methanol/carbon tetrachloride (60/30/10 vol. %) mixture, giving 24 g. of solid; m.p. 179°–180°C.; yield of isolated heptachloro-5H-1-pyridine was 14.4%.

Elemental analysis:
Found: C = 26.7%; N = 4.2%.
Calculated for $C_8Cl_7N$ (MW 358.29):
C = 26.8%; N = 3.9%; Cl = 69.3%.

Mass spectrum: parent peak at m/e 355, 7 Cl.
The position of the geminal dichloro moiety was determined by X-ray crystallography.

EXAMPLE 2

Chlorination of 4-n-Propylpyridine

| | |
|---|---|
| Reactor Volume | 2250 cc. |
| Feed | 10% by weight in $CCl_4$ |
| Feed Rate | 4.1 g/min. |
| Chlorine Rate | 5.1 g/min. |
| Molar Ratio of $Cl_2$/pyridine der. | ~ 21/1 |
| Reactor Temperature | 550°C. |
| Vaporizer Exit Temperature | 220°C. |
| Residence Time | 20 seconds |
| Nozzle Velocity | ~ 2290 cm/sec. |
| Run Time | 72 minutes |
| Crude Yield | 55 grams (semi-solid) | g.l.c. analysis:

8 m% of unidentified,
36 m% of pentachloropyridine,
27 m% of heptachloro-4-vinylpyridine
29 m% of heptachloro 5H (or 6H or 7H)-2-pyridine The semi-solid product was filtered to give 20.2 grams of solid. Three recrystallizations from CCl₄/hexane (1/1) gave a solid product with a melting point of 180.5°–182.0°C. The infrared scan of the solid was different from that of heptachloro-5H-1-pyrindine (obtained from chlorination of 2-n-propylpyridine, see Example 1). Mass spectrum: parent peak at m/e 355, 7 Cl.

Elemental analysis:
Found: C = 27.0%; Cl = 69.2%; N = 3.7%.
Calc. for $C_8Cl_7N$ (MW 358.3):
C = 26.8%; Cl = 69.3%; N = 3.9%.

The estimated yield of heptachloro-5H (or 6H or 7H)-2-pyrindine in the crude product was 27.6%.

Similar results to those described in Examples 1 and 2 are obtained at temperatures as low as 500° and as high as 600°C. The relative proportions of products - such as pentachloropyridine, formed as a consequence of chlorinolysis - are higher at the higher temperatures. Longer residence times are required at the lower temperatures.

The compounds of the present invention are active as microbiological toxicants. For such uses, the compounds singly or in admixture with each other, can be employed in an unmodified form or dispersed on finely divided solids and employed as dusts. Such mixtures can also be dispersed in water with or without the aid of a surface active agent and the resulting aqueous suspensions employed as the active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions.

These toxicants are employed with good results in compositions containing them in concentrations ranging from about 10 to 4000 parts per million by weight.

In a representative operation, heptachloro-5H-1-pyrindine gave 100% control of Bean Powdery Mildew when sprayed as an aqueous 0.4% dispersion to run-off on four-inch Cranberry Bean plants which were subsequently contacted directly with infested leaves. (The readings were made 7 days after infestation.) Identical results were obtained with the heptachloro-5H (or 6H or 7H) 2-pyrindine of Example 2 when employed in the same manner and at the same concentration.

In another representative operation, heptachloro-5H-1-pyrindine gave at least 95% control of Rice Blast (*Piricularia oryzae*) when sprayed as a 0.04% dispersion in 20% aqueous isopropyl alcohol to run off on rice plants (in vermicullite) which were subsequently inoculated with the pathogen. (Readings made 10 days after inoculation).

In yet another operation, heptachloro-5H-1-pyrindine, when applied as the sole toxicant in a nutrient agar at a concentration of from 1 to 500 parts per million parts of agar, was found to give 100% kill and control of the organisms *Staphylococcus aureus*, *Tricophton mentagrophytes*, *Bacillus subtilis* and *Mycobacterium phlei*.

100% kill and control of the latter three organisms was obtained in an identical operation with heptachloro-5H- (or 6H or 7H)-2-pyrindine (Example 2) at concentrations of from 100 to 500 parts per million.

I claim:
1. Heptachloro-5H-1-pyrindine.
2. A process for the production of heptachloropyrindines comprising
   1. introducing into a reaction zone with rapid, turbulent mixing, vaporized 2- or 4-(n-propyl)pyridine in a substantially inert diluent vapor and at least 10 molar proportions of chlorine per molar proportion of pyridine compound while said reaction zone is maintained at a temperature in the range of from about 500°C. to about 600°C.,
   2. maintaining the resultant mixture in said zone for a residence time of at least one second.
3. The process of claim 2 in which the n-propylpyridine compound is mixed with a volatile chlorocarbon diluent and the resulting solution introduced to the reaction zone as a vapor.
4. The process of claim 3 in which the temperature is in the range of about 540° to about 560°C., the mole ratio of chlorine to the n-propylpyridine is from about 20/1 to about 50/1 and the residence time is from about 10 to about 25 seconds.

* * * * *